March 16, 1948.     W. R. DITTMAR     2,437,877
LINK-PIN RETAINING DEVICE FOR RADIAL ENGINES
Filed July 4, 1945     2 Sheets-Sheet 1
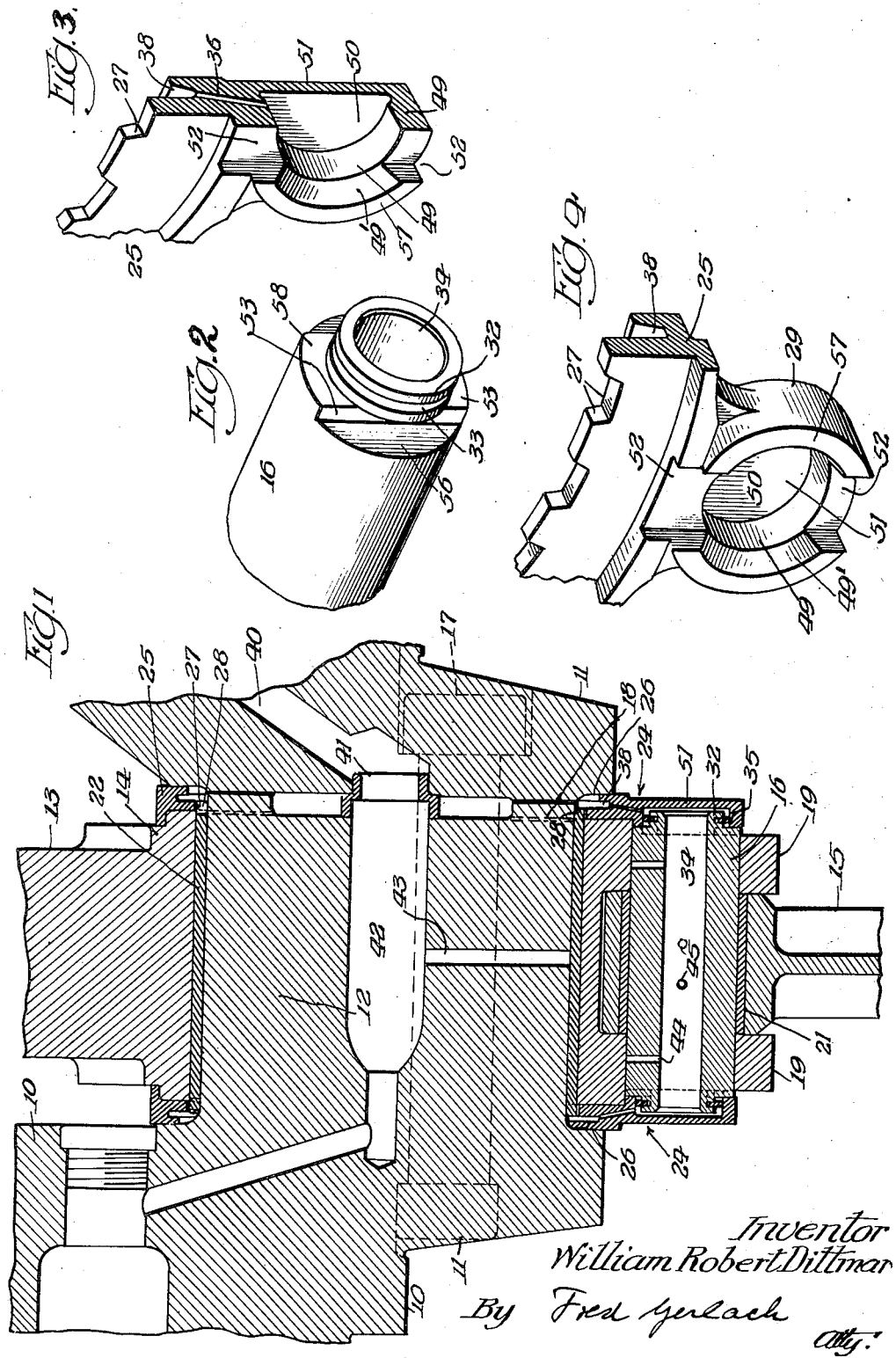
Inventor
William Robert Dittmar
By Fred Gerlach
Atty.

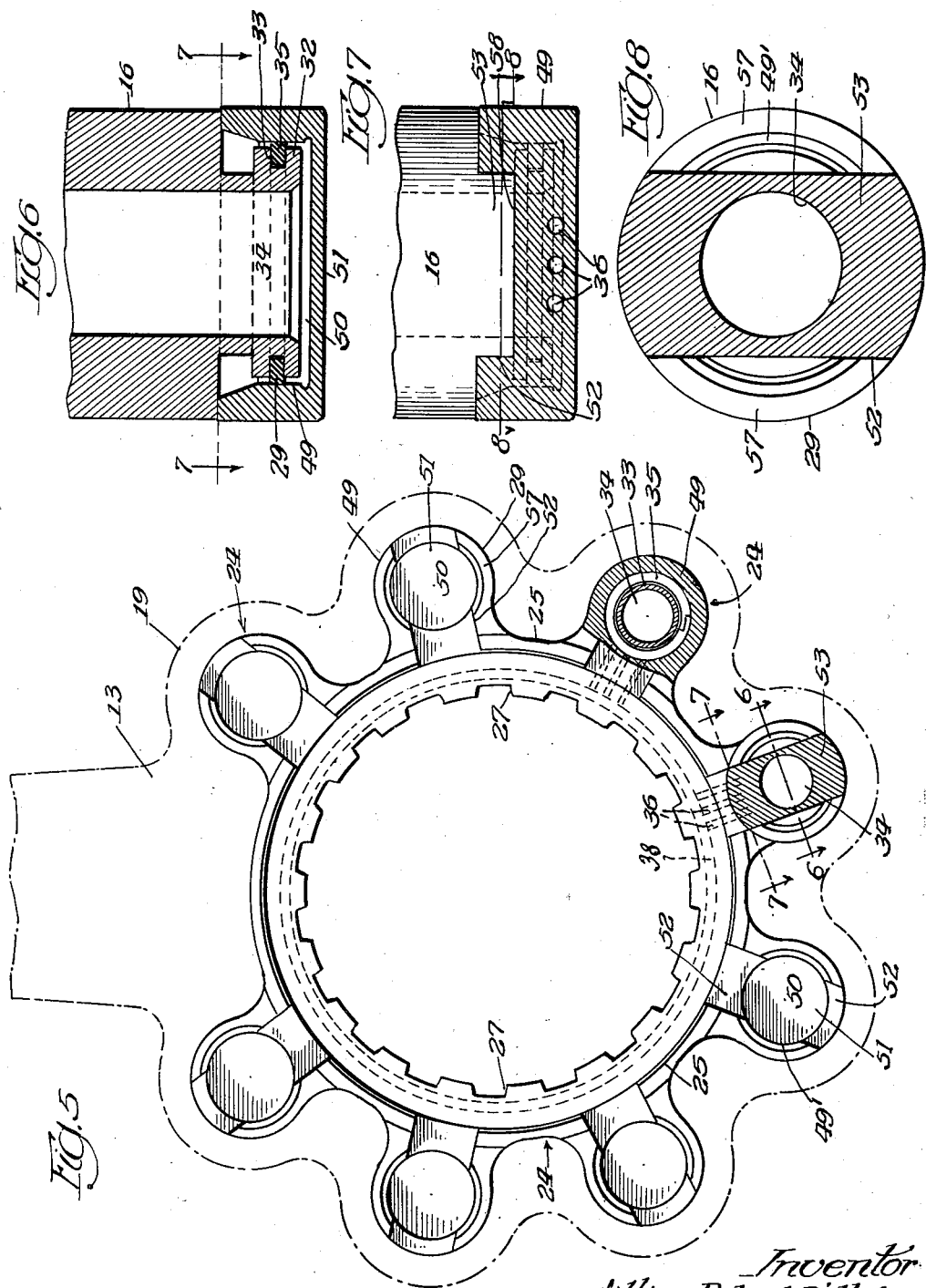

Patented Mar. 16, 1948

2,437,877

UNITED STATES PATENT OFFICE 2,437,877

LINK-PIN RETAINING DEVICE FOR RADIAL ENGINES

William Robert Dittmar, Williamsport, Pa., assignor to Avco Manufacturing Corporation, a corporation of Delaware Application July 4, 1945, Serial No. 603,159

8 Claims. (Cl. 74—580)

The invention relates to radial engines and more particularly to retaining devices for link-pins which connect the master connecting rod and a series of link-rods which are operated by the pistons in a series of radial cylinders.

In the operation of radial engines of this type, it has been found that when the link-pins are not secured against rotation relatively to the retaining-rings which are secured to the master connecting rod, said pins will be subjected to wear and stresses which cause them to break or crack.

The primary object of the invention is to provide a construction for use in this type of engine in which the link-pins will be secured against rotation in the retaining-rings to prevent this cracking or breaking without increasing the number of parts, or by means of interfitting parts which are integral with the retaining-rings and the link-pins.

Another object of the invention is to provide a construction for this purpose in which the parts can be readily assembled into operative relation.

Other objects of the invention will appear from the detailed description.

The invention consists in the several features hereinafter set forth and more particularly defined by claims at the conclusion hereof.

In the drawings:

Fig. 1 is a longitudinal section through a portion of the crank-shaft, the master connecting rod, and the pins for the link connecting rods.

Fig. 2 is a perspective of one end portion of one of the link-pins.

Fig. 3 is a sectional perspective of a portion of one of the link retaining-rings.

Fig. 4 is a perspective of the portion of one of the retaining-rings in which the end of a link-pin is held.

Fig. 5 is an inner side elevation of one of the link-pin retainers, one link-pin being shown in section at the split-ring in one of the retainer-arms, and another link-pin being shown with its interlocking rib in section.

Fig. 6 is a section taken on line 6—6 of Fig. 5.

Fig. 7 is a section taken on line 7—7 of Fig. 5 the link pin being shown in elevation.

Fig. 8 is a section taken on line 8—8 of Fig. 6.

The invention is exemplified in a radial engine which comprises: a sectional shaft 10 which is provided with a crank 11, and a crank-pin 12, the sections being provided with interfitting ribs 18 between one end of the crank-pin and one of the sections and being secured together by bolts 17; a master connecting rod 13 which is operable by a piston in one of the radial series of cylinders (not shown) and provided with an integral annular portion 14 through which the crank-pin 12 extends; a series of link-rods 15 which are operable by the remaining pistons in the associated radial cylinders; and link-pins 16 which connect the rods 15 and the master connecting rod 13. The annular portion 14 of connecting rod 13 is provided with a fork or spaced ears 19 for each of the link-pins 16 and in which said pins are confined. Each link-pin 16 extends through one of the link-rods 15 which are confined axially between aligned pairs of lugs 19 on the annulus 14 of the master connecting rod 13. A sleeve 21 is pressed into a transverse hole in the inner end of each link-rod 15, fits around the outer periphery of its link-pin 16, and forms a bearing between the link-rod and the link-pin. A sleeve 22 fits in the annular portion 14 of the master connecting rod 13, and around the crank-pin 12 and forms a bearing for the master connecting rod on the crank-pin 12. A retainer, generally designated 24, is provided at each side of the master rod 13 for confining the link-pins 16 in the master connecting rod and conducting lubricating oil from the periphery of the crank-pin 12 to the link-pins from which the oil is conducted to the bearing surfaces between the link-pins and the master connecting rod and to the bearing surfaces between the link-pins and sleeves 21 in the link-rods 15. These retainers also function as closures for the ends of the link-pins, and are locked to bearing sleeve 22 for rotation with the master connecting rod.

Each retainer 24 comprises a ring or annulus 25 which fits between one side of the master connecting rod 13 and a shoulder 26 at one end of crank-pin 12 and is provided with a series of splines 27 which interfit with splines 28 on one end of bearing sleeve 22 for locking said sleeve for rotation with the master connecting rod. The annulus 25 of each retainer 24 has integrally formed therewith a series of outwardly extending arms or members 29. Each arm 29 has an integral cylindrical wall 49 and an integral end-wall 51 which form a cup-shaped recess or cylindrical socket 50 which is adapted to receive and enclose an end portion of a link-pin 16.

Lubricating oil from the usual engine pressure lubricating system, as well understood in the art, is delivered through a duct 40 in one side of crank 11 and a collar 41 into a central duct 42 in crank-pin 12. A port 43 communicatively connects duct 42 and the periphery of the crank-pin 12 for delivering oil to the bearing surfaces between the crank-pin and the master connecting rod 13. The oil passes from the ends of the bearing surfaces between the crank-pin and sleeve 22 into annular grooves 38 formed in the rings 25. Each ring 25 is provided with series of ducts 36 for conducting oil from annular groove 38 into the outer ends of the cylindrical sockets 50 in each arm 29 of the retainer 24.

Each link-pin 16 is provided with a cylindrical duct 34 extending longitudinally therethrough which is communicatively connected by ports 44 to the bearing surfaces between the master connecting rod 13 and said pin and with ports 45 which are communicatively connected to the bearing surface between said pin and its link-rod 15. The lubricating oil passing into cylindrical sockets 50 flows through ducts 34 to ports 44 and 45.

Each link-pin 16 comprises a cylindrical portion which fits in its bearings in lugs 19 of the master connecting rod 13 and the bearing-sleeve 21 in one of the link-rods 15. Each end-portion 32 of link-pins 16 is of reduced diameter and adapted to extend into the contiguous cylindrical socket 50 of one of the retainers 24. Each reduced end-portion 32 of the link pin is provided with an annular groove 33 in which is confined a split-ring 35 similar to a piston-ring which forms a seal between the link-pin and the retainer for preventing escape of oil from socket 50 to the outside of the link-pin.

Each end of link-pin 16 and the contiguous retainer is provided with interfitting members or parts for locking the link-pin against rotation to the retainer in the master connecting rod. These parts or members comprise a notch or recess 52 in the inner face of and at diametrically opposite portions of each arm 29 and a straight-sided member or rib 53 integral with the link-pin fitting in the recess or notch 52 in arm 29. Link-pins 16 at the sides of members 53 are provided with end face portions 56 which abut against the inner faces of arcuate portions 57 of the cylindrical wall 49 between the recess 52. The outer end faces 58 of member 53 abut against the inner ends of the recesses 52. Ribs 53 constitute integral members on the link-pins 16 which interfit with the recesses 52 in integral parts of the annular cylindrical walls 49 for holding said pins against endwise movement in the retainers and for locking them against rotation in the retainers and relatively to the master connecting rod 13. The inner corners of faces of the cylindrical walls 49 are bevelled, as at 49', to facilitate the assembly of the link-pins 16 and the retainers 24 by contracting the split-rings 35.

In the operation of the engine, the action of the link-rods 15 tends to rotate the link-pins 16 on their axes in the master connecting rod 13. The retainers 24 lock bearing-sleeve 22 against rotation in the master connecting rod, hold the link-pins 16 against axial movement in the master rod and conduct lubricating oil from the bearing surfaces between the crank-pin 12 and sleeve 22 into the link-pins for lubricating the bearing-surfaces between the link-pins and the master rod and the link connecting rods. The interfit between parts or members 53 on the link-pins 16 and the recesses 52 in the retainers 24 prevent rotation of the link-pins in the retainers and relatively to the master connecting rod.

The link-pins 16 when supported in the lugs 19 at their end portion in the master connecting rod 13, as shown, form a simple beam having force applied from the link-rods 15 at their vertical portions. The portions of the link-pins in the direction of applied force by the link-rods will be under stress and if the oil holes 40—45 are allowed to rotate, they sometimes assume a position so that high stress forces will be set up adjacent the oil holes which will cause cracking of the pins. If, however, these holes are held in a plane at right angles to the direction of the applied force, the stress force is low and no cracking occurs. The interfitting connections between the link-pins and the retainers prevent such wear and cracking. This result is attained by parts which are integral with the retainers and the link-pins without additional elements. The link-pins and retainers can be easily assembled on the crank-pin by the interfitting recesses 52 on the link-retainers and ribs 53 on the link-pins inwardly of the rings 35, the latter effectively forming seals for retaining oil in the cylindrical sockets 50 in the retainers. The flared portions 49' at the inner face of the cylindrical sockets facilitate the assembly of the retaining-rings with link-pins carrying resilient sealing rings 35 adapted to fit said sockets. Preferably, like interfitting devices are provided between both ends of the link-pins and retainers, respectively, for better retaining the link-pins against torsional stresses but in some instances the interfitting parts at one end of the link-pins may be dispensed with. The interfitting means inwardly of the sealing rings and confined in the reduced ends of the link-pins make it possible to compensate for production variations or tolerances in mating the ends of the link-pins and the sockets in the retainers so that it is not necessary to individually fit link-pins in the sockets in the retainers.

The invention is not to be understood as limited to the details described, since these may be modified within the scope of the appended claims without departing from the spirit and scope of the invention.

Having thus described the invention, what I claim as new and desire to secure by Letters Patent is:

1. In a radial engine, which comprises: a shaft with a crank-pin, means for conducting lubricant to the periphery of the crank-pin, a master connecting rod on the crank-pin, a series of link connecting rods, a series of link-pins journalled in said master rod and on which the link-rods are journalled, and provided with means for conducting lubricant to their bearings in the master rod and to the bearings for the link-rods on the link-pins, and a pair of retainers at the sides of, for holding the link-pins axially in, and secured to move with the master rod, provided with recesses into which the end-portions of the link-pins extend and ducts for lubricant from the crank-pin to the recesses; interfitting parts integral with one of the end-portions of the link-pins and one of the retainers, for securing the link-pins against rotation in the retainers.

2. In a radial engine, which comprises: a shaft with a crank-pin, means for conducting lubricant to the periphery of the crank-pin, a master connecting rod on the crank-pin, a series of link connecting rods, a series of link-pins journalled in said master rod and on which the link-rods are journalled, and provided with means for conducting lubricant to their bearings in the master rod and to the bearings for the link-rods on the link-pins and with end-portions of reduced diameter, and a pair of retainers at the sides of, for holding the link-pins axially in, and secured to move with the master rod, provided with recesses in which the ends of the link-pins extend and ducts for lubricant from the crank-pin to the recesses; interfitting parts integral with one end-portion of the link-pin and one of the retainers, for securing the link-pins against rotation in the master rod, and sealing-means between the reduced end-portions of the link-pins and the retainers.

3. In a radial engine, which comprises a shaft with a crank-pin, means for conducting lubricant to the periphery of the crank-pin, a master connecting rod on the crank-pin, a series of link connecting rods, a series of link-pins journalled in said master rod and on which the link-rods are journalled, provided with means for conducting lubricant to their bearings in the master rod and to the bearings for the link-rods on the link-pins and with end-portions of reduced diameter, and a pair of retainers at the sides of and for holding the link-pins axially in the master rod, provided with recesses to which the ends of the link-pins extend, ducts for lubricant from the crank-pin to the recesses; interfitting parts integral with one of the ends of the link-pins and one of the retainers for securing the link-pins against rotation in the master rod and sealing-means between said end-portion of the link-pins and the retainers, the recess in said retainer having a flared portion around said reduced end-portion of the link-pin.

4. In a radial engine, which comprises: a shaft with a crank-pin, means for conducting lubricant to the periphery of the crank-pin, a master connecting rod on the crank-pin, a series of link connecting rods, a series of link-pins journalled in said master rod and on which the link-rods are journalled, provided with means for conducting lubricant to their bearings in the master rod and to the bearings for the link-rods on the link-pins and with abutments and with end-portions of reduced diameter, and a pair of retainers at the sides of and secured to rotate with the master rod, provided with recesses in which the ends of the link-pins extend and abutments on their inner faces and fitting against the abutments on the link-pins for holding the link-pins against axial movement, ducts for lubricant from the crank-pins to the recesses; interfitting parts at the abutments integral with one end of each link-pin and one of the retainer, for securing the link-pins against rotation in the master rod, and sealing-means between the reduced end-portions of the link-pins and the retainers.

5. In a radial engine, which comprises: a shaft with a crank-pin, means for conducting lubricant to the periphery of the crank-pin, a master connecting rod on the crank-pin, a series of link connecting rods, a series of link-pins journalled in said master rod and on which the link-rods are journalled, provided with means for conducting lubricant to their bearings in the master rod and to the bearings for the link-rods on the link-pins, and a pair of retainers at the sides of, for holding the link-pins axially in and secured to move with the master rod, provided with recesses into which the ends of the link-pins extend and ducts for lubricant from the crank-pin to the recesses; axially engageable interfitting parts integral with the retainers and the link-pins for securing the link-pins and retainers relative against rotation.

6. In a radial engine, which comprises: a shaft with a crank-pin, means for conducting lubricant to the periphery of the crank-pin, a master connecting rod on the crank-pin, a series of link connecting rods, a series of link-pins journalled in said master rod and on which the link-rods are journalled, provided with means for conducting lubricant to their bearings in the master rod and to the bearings for the link-rods on the link pins, and a pair of retainers at the sides of, for holding the link-pins axially in and secured to move with the master rod, provided with recesses into which the ends of the link-pins extend and ducts for lubricant from the crank-pin to the recesses; axially engageable interfitting parts integral with the retainers and the link-pins for securing the link-pins against rotation in the retainers, and means forming seals between the ends of the link-pins and the recesses in the retainers.

7. In a radial engine, which comprises: a shaft with a crank-pin, means for conducting lubricant to the periphery of the crank-pin, a master connecting rod on the crank-pin, a series of link connecting rods, a series of link-pins journalled in said master rod and on which the link-rods are journalled, and provided with means for conducting lubricant to their bearings in the master rod and to the bearings for the link-rods on the link-pins and with end-portions of reduced diameter, and a pair of retainers at the sides of, for holding the link-pins axially in and secured to move with the master rod, provided with recesses into which the end-portions of the link-pins extend and ducts for lubricant from the crank-pin to the recesses; interfitting parts inwardly of said reduced end-portions and integral with the retainers and the link-pins for securing the link-pins against rotation in the retainers, and means outwardly of said parts forming seals between the reduced ends of the link-pins and the recesses in the retainers.

8. In a radial engine, which comprises: a shaft with a crank-pin, means for conducting lubricant to the periphery of the crank-pin, a master connecting rod on the crank-pin, a series of link connecting rods, a series of link-pins journalled in said master rod and on which the link-rods are journalled, and provided with means for conducting lubricant to their bearings in the master rod and to the bearings for the link-rods on the link-pins and with shoulders and with end-portions of reduced diameter, and a pair of retainers at the sides of and for holding the link-pins axially in the master rod, provided with recesses into which the ends of the link-pins extend and ducts for lubricant from the crank-pin to the recesses; interfitting parts on the shoulders and integral with the retainers and the link-pins for securing the link-pins against rotation in the retainers, the retainers being provided with flared portions around the reduced ends of the pins, and means forming seals between the reduced ends of the link-pins and the recesses in the retainers.

WILLIAM ROBERT DITTMAR.

REFERENCES CITED

The following references are of record in the file of this patent:

UNITED STATES PATENTS

| Number | Name | Date |
| --- | --- | --- |
| 1,842,468 | Woolson | Jan. 26, 1932 |
| 2,225,876 | Mead et al. | Dec. 24, 1940 |
| 2,239,039 | Hill | Apr. 22, 1941 |
| 2,342,036 | Chilton | Feb. 15, 1944 |